US012731560B2

(12) United States Patent
Wu et al.

(10) Patent No.: US 12,731,560 B2
(45) Date of Patent: Sep. 8, 2026

(54) LIGHT EMISSION CONTROL METHOD

(71) Applicant: Macroblock, Inc., Hsinchu (TW)

(72) Inventors: Ming-Jia Wu, Hsinchu (TW); Yu-Cheng Liang, Hsinchu (TW)

(73) Assignee: Macroblock, Inc., Hsinchu (TW)

( * ) Notice: Subject to any disclaimer, the term of this patent is extended or adjusted under 35 U.S.C. 154(b) by 0 days.

(21) Appl. No.: 19/311,071

(22) Filed: Aug. 27, 2025

(65) Prior Publication Data

US 2026/0065877 A1 Mar. 5, 2026

(30) Foreign Application Priority Data

Aug. 29, 2024 (TW) ................................ 113132477

(51) Int. Cl.
*G09G 5/10* (2006.01)

(52) U.S. Cl.
CPC ....... *G09G 5/10* (2013.01); *G09G 2320/0266* (2013.01); *G09G 2320/0626* (2013.01)

(58) Field of Classification Search
CPC .......... G09G 3/2018; G09G 3/32; G09G 3/20; G09G 5/10; G09G 2320/0266; G09G 2320/0626; G09G 3/00
See application file for complete search history.

(56) References Cited

U.S. PATENT DOCUMENTS

2019/0279577 A1* 9/2019 Zhou ...................... G09G 3/003
2021/0065608 A1* 3/2021 Zhai ..................... G09G 3/2074

* cited by examiner

*Primary Examiner* — Michael A Faragalla
(74) *Attorney, Agent, or Firm* — Akerman LLP; Peter A. Chiabotti

(57) ABSTRACT

A light emission control method includes steps of: A) obtaining a number (N); B) obtaining M number of sub-period sequences; C) for a current display period, selecting a first one of the M number of sub-period sequences as a current sub-period sequence, and determining display time unit numbers based on an image grayscale value contained in a to-be-displayed image, the number (N) and the current sub-period sequence; D) for a next display period, selecting a next one of the M number of sub-period sequences as a next sub-period sequence, and determining the display time unit numbers based on an image grayscale value contained in another to-be-displayed image, the number (N) and the next sub-period sequence; and E) in response to the next sub-period sequence not being an $M^{th}$ one of the sub-period sequences, repeating step D).

12 Claims, 11 Drawing Sheets

| Sub-period order | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| First frame display sequence | 0 | 8 | 4 | 12 | 2 | 10 | 6 | 14 | 1 | 9 | 5 | 13 | 3 | 11 | 7 | 15 |
| Second frame display sequence | 1 | 9 | 5 | 13 | 3 | 11 | 7 | 15 | 0 | 8 | 4 | 12 | 2 | 10 | 6 | 14 |
| Third frame display sequence | 0 | 8 | 4 | 12 | 2 | 10 | 6 | 14 | 1 | 9 | 5 | 13 | 3 | 11 | 7 | 15 |
| Fourth frame display sequence | 1 | 9 | 5 | 13 | 3 | 11 | 7 | 15 | 0 | 8 | 4 | 12 | 2 | 10 | 6 | 14 |
| Fifth frame display sequence | 0 | 8 | 4 | 12 | 2 | 10 | 6 | 14 | 1 | 9 | 5 | 13 | 3 | 11 | 7 | 15 |
| Sixth frame display sequence | 1 | 9 | 5 | 13 | 3 | 11 | 7 | 15 | 0 | 8 | 4 | 12 | 2 | 10 | 6 | 14 |
| Seventh frame display sequence | 0 | 8 | 4 | 12 | 2 | 10 | 6 | 14 | 1 | 9 | 5 | 13 | 3 | 11 | 7 | 15 |
| Eighth frame display sequence | 1 | 9 | 5 | 13 | 3 | 11 | 7 | 15 | 0 | 8 | 4 | 12 | 2 | 10 | 6 | 14 |
| ... | ... | ... | ... | ... | ... | ... | ... | ... | ... | ... | ... | ... | ... | ... | ... | ... |

| | | | | | | | | | | | | | | | | |
|---|---|---|---|---|---|---|---|---|---|---|---|---|---|---|---|---|
| Initial sub-period sequence | 0 | 1 | 2 | 3 | 4 | 5 | 6 | 7 | 8 | 9 | 10 | 11 | 12 | 13 | 14 | 15 |
| Initial sub-period sequence in binary | 0000 | 0001 | 0010 | 0011 | 0100 | 0101 | 0110 | 0111 | 1000 | 1001 | 1010 | 1011 | 1100 | 1101 | 1110 | 1111 |
| Initial sub-period sequence after bit-reversal in binary | 0000 | 1000 | 0100 | 1100 | 0010 | 1010 | 0110 | 1110 | 0001 | 1001 | 0101 | 1101 | 0011 | 1011 | 0111 | 1111 |
| First sub-period sequence | 0 | 8 | 4 | 12 | 2 | 10 | 6 | 14 | 1 | 9 | 5 | 13 | 3 | 11 | 7 | 15 |

FIG. 4

| | | | | | | | | | | | | | | | | |
|---|---|---|---|---|---|---|---|---|---|---|---|---|---|---|---|---|
| Initial sub-period sequence | 0 | 1 | 2 | 3 | 4 | 5 | 6 | 7 | 8 | 9 | 10 | 11 | 12 | 13 | 14 | 15 |
| Initial sub-period sequence in binary | 0000 | 0001 | 0010 | 0011 | 0100 | 0101 | 0110 | 0111 | 1000 | 1001 | 1010 | 1100 | 1100 | 1101 | 1110 | 1111 |
| Initial sub-period sequence after bit-reversal in binary | 0000 | 1000 | 0100 | 1100 | 0010 | 1010 | 0110 | 1110 | 0001 | 1001 | 0101 | 1101 | 0011 | 1011 | 0111 | 1111 |
| Initial sub-period sequence after bit-reversal | 0 | 8 | 4 | 12 | 2 | 10 | 6 | 14 | 1 | 9 | 5 | 13 | 3 | 11 | 7 | 15 |
| First sub-period sequence obtained by shifting | 7 | 15 | 0 | 8 | 4 | 12 | 2 | 10 | 6 | 14 | 1 | 9 | 5 | 13 | 3 | 11 |

FIG. 5

| Sub-period order | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| First frame display sequence | 0 | 8 | 4 | 12 | 2 | 10 | 6 | 14 | 1 | 9 | 5 | 13 | 3 | 11 | 7 | 15 |
| Second frame display sequence | 1 | 9 | 5 | 13 | 3 | 11 | 7 | 15 | 0 | 8 | 4 | 12 | 2 | 10 | 6 | 14 |
| Third frame display sequence | 0 | 8 | 4 | 12 | 2 | 10 | 6 | 14 | 1 | 9 | 5 | 13 | 3 | 11 | 7 | 15 |
| Fourth frame display sequence | 1 | 9 | 5 | 13 | 3 | 11 | 7 | 15 | 0 | 8 | 4 | 12 | 2 | 10 | 6 | 14 |
| Fifth frame display sequence | 0 | 8 | 4 | 12 | 2 | 10 | 6 | 14 | 1 | 9 | 5 | 13 | 3 | 11 | 7 | 15 |
| Sixth frame display sequence | 1 | 9 | 5 | 13 | 3 | 11 | 7 | 15 | 0 | 8 | 4 | 12 | 2 | 10 | 6 | 14 |
| Seventh frame display sequence | 0 | 8 | 4 | 12 | 2 | 10 | 6 | 14 | 1 | 9 | 5 | 13 | 3 | 11 | 7 | 15 |
| Eighth frame display sequence | 1 | 9 | 5 | 13 | 3 | 11 | 7 | 15 | 0 | 8 | 4 | 12 | 2 | 10 | 6 | 14 |
| ... | ... | ... | ... | ... | ... | ... | ... | ... | ... | ... | ... | ... | ... | ... | ... | ... |

FIG. 6

| | | | | | | | | | | | | | | | | |
|---|---|---|---|---|---|---|---|---|---|---|---|---|---|---|---|---|
| Sub-period order | 0 | 1 | 2 | 3 | 4 | 5 | 6 | 7 | 8 | 9 | 10 | 11 | 12 | 13 | 14 | 15 |
| First frame display sequence | 0 | 8 | 4 | 12 | 2 | 10 | 6 | 14 | 1 | 9 | 5 | 13 | 3 | 11 | 7 | 15 |
| Equivalent activation duration | 4T | 0 | 0 | 0 | 1T | 0 | 0 | 0 | 4T | 0 | 0 | 0 | 0 | 0 | 0 | 0 |
| Second frame display sequence | 1 | 9 | 5 | 13 | 3 | 11 | 7 | 15 | 0 | 8 | 4 | 12 | 2 | 10 | 6 | 14 |
| Equivalent activation duration | 4T | 0 | 0 | 0 | 0 | 0 | 0 | 0 | 4T | 0 | 0 | 0 | 1T | 0 | 0 | 0 |

FIG. 7

| Sub-period order | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| First frame display sequence | 0 | 8 | 4 | 12 | 2 | 10 | 6 | 14 | 1 | 9 | 5 | 13 | 3 | 11 | 7 | 15 |
| Second frame display sequence | 13 | 3 | 11 | 7 | 15 | 0 | 8 | 4 | 12 | 2 | 10 | 6 | 14 | 1 | 9 | 5 |
| Third frame display sequence | 6 | 14 | 1 | 9 | 5 | 13 | 3 | 11 | 7 | 15 | 0 | 8 | 4 | 12 | 2 | 10 |
| Fourth frame display sequence | 0 | 8 | 4 | 12 | 2 | 10 | 6 | 14 | 1 | 9 | 5 | 13 | 3 | 11 | 7 | 15 |
| Fifth frame display sequence | 13 | 3 | 11 | 7 | 15 | 0 | 8 | 4 | 12 | 2 | 10 | 6 | 14 | 1 | 9 | 5 |
| Sixth frame display sequence | 6 | 14 | 1 | 9 | 5 | 13 | 3 | 11 | 7 | 15 | 0 | 8 | 4 | 12 | 2 | 10 |
| Seventh frame display sequence | 0 | 8 | 4 | 12 | 2 | 10 | 6 | 14 | 1 | 9 | 5 | 13 | 3 | 11 | 7 | 15 |
| Eighth frame display sequence | 13 | 3 | 11 | 7 | 15 | 0 | 8 | 4 | 12 | 2 | 10 | 6 | 14 | 1 | 9 | 5 |
| ... | ... | ... | ... | ... | ... | ... | ... | ... | ... | ... | ... | ... | ... | ... | ... | ... |

FIG. 9

| Sub-period order | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| First frame display sequence | 0 | 8 | 4 | 12 | 2 | 10 | 6 | 14 | 1 | 9 | 5 | 13 | 3 | 11 | 7 | 15 |
| Second frame display sequence | 1 | 9 | 5 | 13 | 3 | 11 | 7 | 15 | 0 | 8 | 4 | 12 | 2 | 10 | 6 | 14 |
| Third frame display sequence | 0 | 8 | 4 | 12 | 2 | 10 | 6 | 14 | 1 | 9 | 5 | 13 | 3 | 11 | 7 | 15 |
| Fourth frame display sequence | 1 | 9 | 5 | 13 | 3 | 11 | 7 | 15 | 0 | 8 | 4 | 12 | 2 | 10 | 6 | 14 |
| Fifth frame display sequence | 0 | 8 | 4 | 12 | 2 | 10 | 6 | 14 | 1 | 9 | 5 | 13 | 3 | 11 | 7 | 15 |
| Sixth frame display sequence | 1 | 9 | 5 | 13 | 3 | 11 | 7 | 15 | 0 | 8 | 4 | 12 | 2 | 10 | 6 | 14 |
| Seventh frame display sequence | 0 | 8 | 4 | 12 | 2 | 10 | 6 | 14 | 1 | 9 | 5 | 13 | 3 | 11 | 7 | 15 |
| Eighth frame display sequence | 1 | 9 | 5 | 13 | 3 | 11 | 7 | 15 | 0 | 8 | 4 | 12 | 2 | 10 | 6 | 14 |
| ... | ... | ... | ... | ... | ... | ... | ... | ... | ... | ... | ... | ... | ... | ... | ... | ... |

FIG. 10

| Image capturing device frames | Sub-period order | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| First frame | First frame display sequence | 0 | 8 | 4 | 12 | 2 | 10 | 6 | 14 | 1 | 9 | 5 | 13 | 3 | 11 | 7 | 15 |
| | Second frame display sequence | 0 | 8 | 4 | 12 | 2 | 10 | 6 | 14 | 1 | 9 | 5 | 13 | 3 | 11 | 7 | 15 |
| | Third frame display sequence | 0 | 8 | 4 | 12 | 2 | 10 | 6 | Switch to the next frame display sequence | | | | | | | | |
| Second frame | Fourth frame display sequence | 1 | 9 | 5 | 13 | 3 | 11 | 7 | 15 | 0 | 8 | 4 | 12 | 2 | 10 | 6 | 14 |
| | Fifth frame display sequence | 1 | 9 | 5 | 13 | 3 | 11 | 7 | 15 | 0 | 8 | 4 | 12 | 2 | 10 | 6 | 14 |
| | Sixth frame display sequence | 1 | 9 | 5 | 13 | 3 | 11 | 7 | Switch to the next frame display sequence | | | | | | | | |
| Third frame | Seventh frame display sequence | 0 | 8 | 4 | 12 | 2 | 10 | 6 | 14 | 1 | 9 | 5 | 13 | 3 | 11 | 7 | 15 |
| | Eighth frame display sequence | 0 | 8 | 4 | 12 | 2 | 10 | 6 | 14 | 1 | 9 | 5 | 13 | 3 | 11 | 7 | 15 |
| | Ninth frame display sequence | 0 | 8 | 4 | 12 | 2 | 10 | 6 | Switch to the next frame display sequence | | | | | | | | |
| ... | ... | ... | ... | ... | ... | ... | ... | ... | ... | ... | ... | ... | ... | ... | ... | ... | ... |

FIG. 11

| Image capturing device frames | Sub-period order | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| First frame | First frame display sequence | 0 | 8 | 4 | 12 | 2 | 10 | 6 | 14 | 1 | 9 | 5 | 13 | 3 | 11 | 7 | 15 |
| | Second frame display sequence | 1 | 9 | 5 | 13 | 3 | 11 | 7 | 15 | 0 | 8 | 4 | 12 | 2 | 10 | 6 | 14 |
| | Third frame display sequence | 0 | 8 | 4 | 12 | 2 | 10 | 6 | Switch to the next frame display sequence | | | | | | | | |
| Second frame | Fourth frame display sequence | 1 | 9 | 5 | 13 | 3 | 11 | 7 | 15 | 0 | 8 | 4 | 12 | 2 | 10 | 6 | 14 |
| | Fifth frame display sequence | 0 | 8 | 4 | 12 | 2 | 10 | 6 | 14 | 1 | 9 | 5 | 13 | 3 | 11 | 7 | 15 |
| | Sixth frame display sequence | 1 | 9 | 5 | 13 | 3 | 11 | 7 | Switch to the next frame display sequence | | | | | | | | |
| Third frame | Seventh frame display sequence | 0 | 8 | 4 | 12 | 2 | 10 | 6 | 14 | 1 | 9 | 5 | 13 | 3 | 11 | 7 | 15 |
| | Eighth frame display sequence | 1 | 9 | 5 | 13 | 3 | 11 | 7 | 15 | 0 | 8 | 4 | 12 | 2 | 10 | 6 | 14 |
| | Ninth frame display sequence | 0 | 8 | 4 | 12 | 2 | 10 | 6 | Switch to the next frame display sequence | | | | | | | | |
| ... | ... | ... | ... | ... | ... | ... | ... | ... | ... | ... | ... | ... | ... | ... | ... | ... | ... |

FIG. 12

LIGHT EMISSION CONTROL METHOD

CROSS-REFERENCE TO RELATED APPLICATION

This application claims priority to Taiwanese Invention Patent Application No. 113132477, filed on Aug. 29, 2024, the entire disclosure of which is incorporated by reference herein.

FIELD

The disclosure relates to a light emission control method.

BACKGROUND

Light-emitting diodes (LEDs) have advantages such as having long operational lifespan, wide viewing angle, and flexibility to be assembled into various sizes according to actual needs. Therefore, LEDs are widely used in displays, decorative lighting, and general illumination. A conventional light emission control method adopts a scrambled pulse width modulation (SPWM) algorithm. The SPWM algorithm increases the refresh rate of the LEDs by scrambling a pulse of a pulse width modulation signal with a relatively large pulse width into multiple scrambled pulses, each with a shorter pulse width, thereby enhancing the grayscale contrast and the display effect of the LEDs.

However, when a frame period of an image includes deadtime, or when sub-periods of the frame period after scrambling have different time durations in which each of the LEDs is activated, capturing a to-be-displayed image with an image capturing device that uses a rolling shutter can lead to large-area scanning dark lines (i.e., visual artifacts), which may result in a poor user experience.

SUMMARY

Therefore, an object of the disclosure is to provide a light emission control method that can alleviate at least one of the drawbacks of the prior art.

According to the disclosure, the light emission control method is to be implemented by a driving circuit for controlling a display. The display includes a plurality of light emitting elements. The light emission control method includes steps of: A) obtaining a number (N), where N>1 and N is a total number of sub-periods included in a frame period of an image of the display; B) obtaining M number of sub-period sequences that are different from each other, each of the M number of sub-period sequences corresponding to an order in which the sub-periods are arranged and activated within the frame period, where M≥2; C) for a current display period, selecting a first one of the M number of sub-period sequences as a current sub-period sequence, and for each to-be-displayed (TBD) image in the current display period, determining display time unit numbers of each of the light emitting elements respectively in the sub-periods based on an image grayscale value of the light emitting element contained in the TBD image, the number (N) and the current sub-period sequence, the display time unit number of the light emitting element in each of the sub-periods being related to a time duration in which the light emitting element is activated during the sub-period; D) for a next display period that is immediately after the current display period, selecting a next one of the M number of sub-period sequences as a next sub-period sequence that is immediately after the current sub-period sequence, and for each another TBD image in the next display period, determining the display time unit numbers of each of the light emitting elements respectively in the sub-periods based on an image grayscale value of the light emitting element contained in the another TBD image, the number (N) and the next sub-period sequence; and E) in response to the next sub-period sequence not being an $M^{th}$ one of the M number of sub-period sequences, setting the next display period as the current display period, setting the next sub-period sequence as the current sub-period sequence, and repeating step D).

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 4 is a diagram illustrating an example of a first one of the M number of sub-period sequences according to an embodiment of the present disclosure.

FIG. 5 is a diagram illustrating another example of the first one of the M number of sub-period sequences according to an embodiment of the present disclosure.

FIG. 6 is a diagram illustrating a plurality of frame display sequences of a display of the display device when a number of the M number of sub-period sequences is two according to a first example.

FIG. 7 is a diagram illustrating equivalent activation durations for each of the frame display sequences in FIG. 6 when an image grayscale value of each light emitting element of the display contained in a to-be-displayed image is 9.

FIG. 9 is a diagram illustrating the frame display sequences of the display when the number of the M number of sub-period sequences is three according to a second example.

FIG. 10 is a diagram illustrating the frame display sequences of the display when the number of the M number of sub-period sequences is two according to the second example.

FIG. 11 is a diagram illustrating the frame display sequences of the display when the number of the M number of sub-period sequences is two, and a value of K is three according to a third example.

FIG. 12 is a diagram illustrating the frame display sequences of the display when the number of the M number of sub-period sequences is two, and the value of K is one.

DETAILED DESCRIPTION

Figure 1:
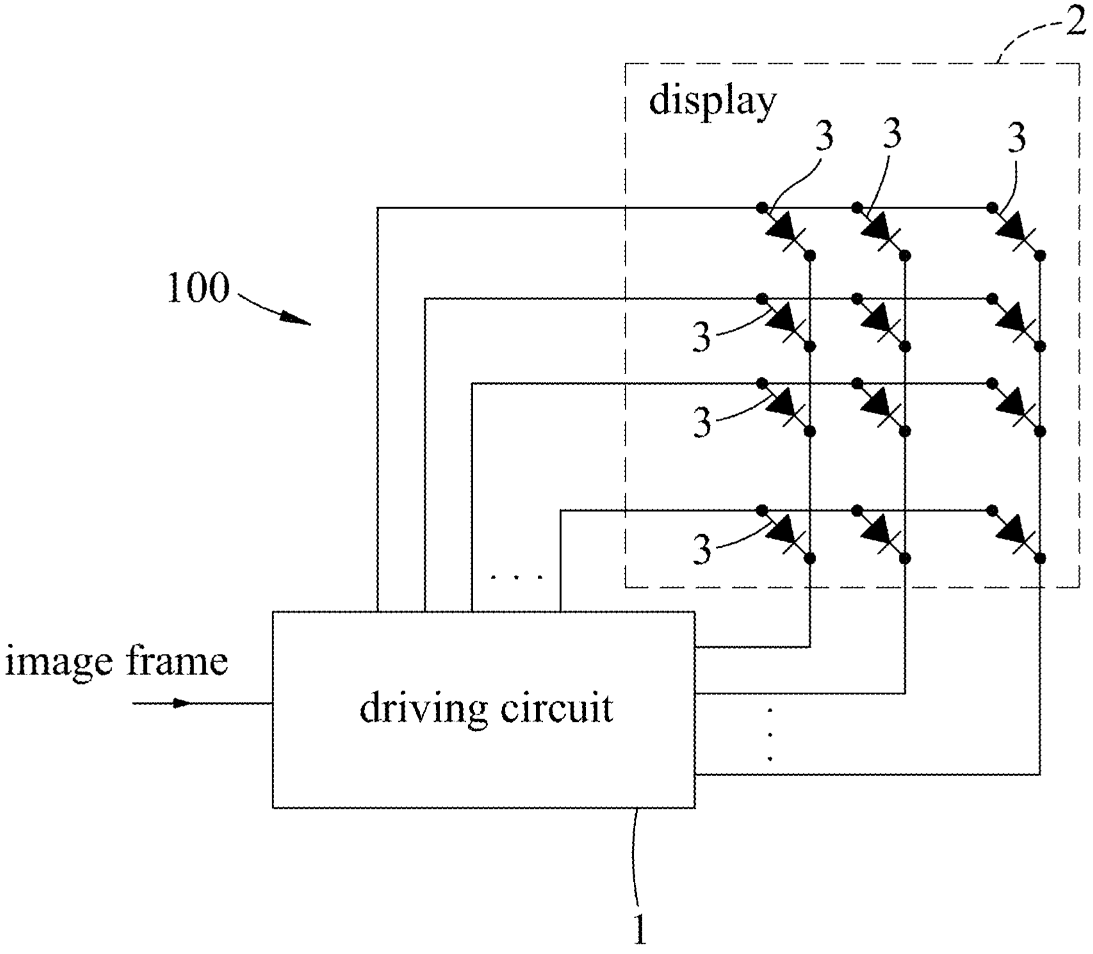
FIG. 1 is a schematic circuit block diagram illustrating a display device according to an embodiment of the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a display device 100 according to an embodiment of the disclosure is communicably connected to an image capturing device (not shown). The display device 100 includes a display 2, and a driving circuit 1 electrically connected to the display 2. The display 2 includes a plurality of light emitting elements 3 that are arranged in multiple rows. Specifically, each row is arranged to include multiple of the light emitting elements 3. Each of the light emitting elements 3 includes a light emitting diode (LED).

Figure 2:
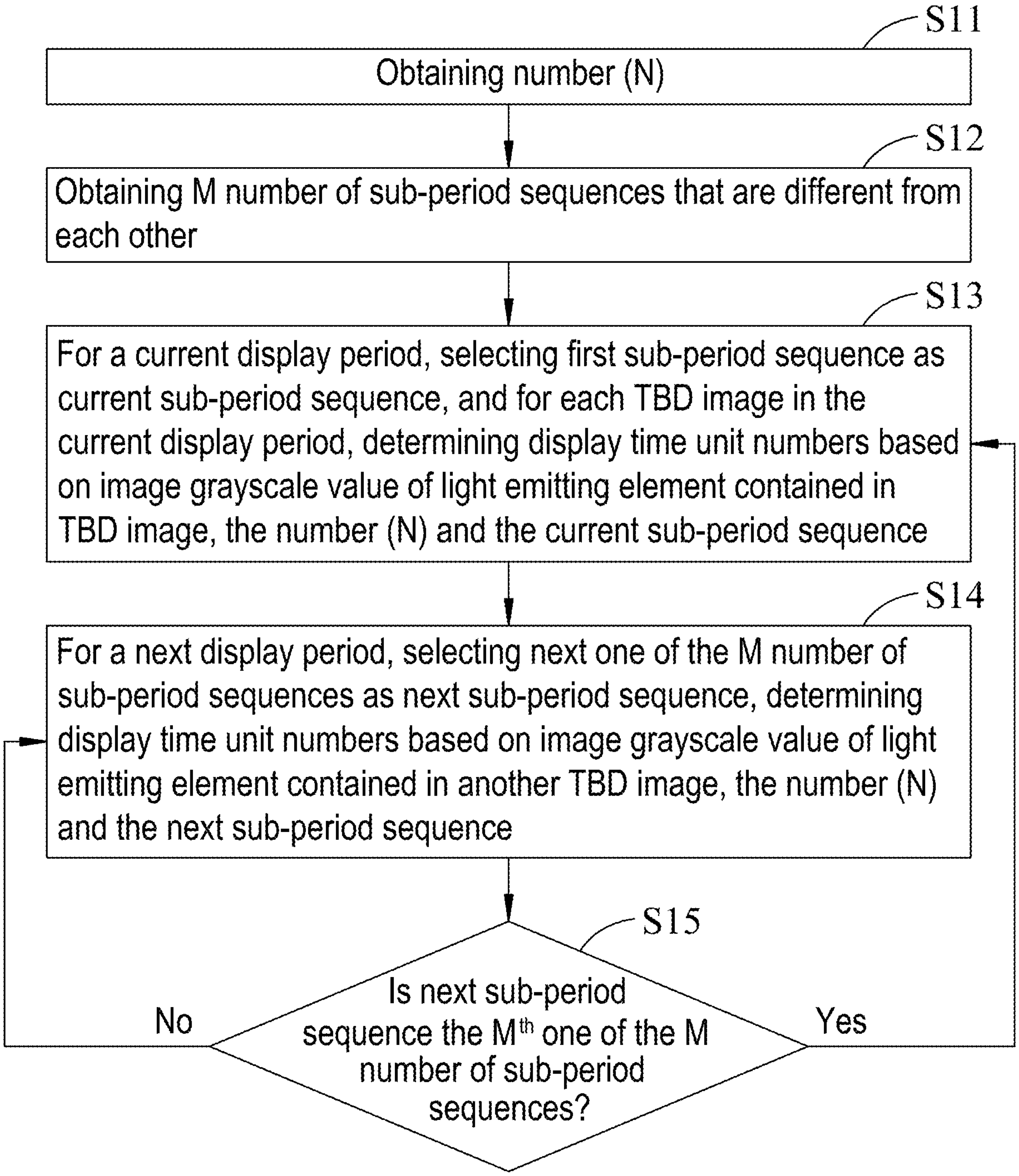
FIG. 2 is a flow chart illustrating a light emission control method according to an embodiment of the present disclosure.

Referring to FIGS. 1 and 2, a light emission control method according to an embodiment of the present disclosure is to be implemented by the driving circuit 1 of FIG. 1. The light emission control method includes steps of S11 to S15.

In step S11, the driving circuit 1 obtains a number (N), where N>1 and N is a total number of sub-periods included in a frame period of an image of the display 2.

In step S12, the driving circuit 1 obtains M number of sub-period sequences that are different from each other, where M≥2. Each of the M number of sub-period sequences corresponds to an order in which the sub-periods are arranged and activated within the frame period of the image of the display 2. In one embodiment, M is equal to an integer value obtained by rounding the frame period of the image of the display 2 divided by an exposure time of the image capturing device, but the disclosure is not limited in this respect.

Figure 3:
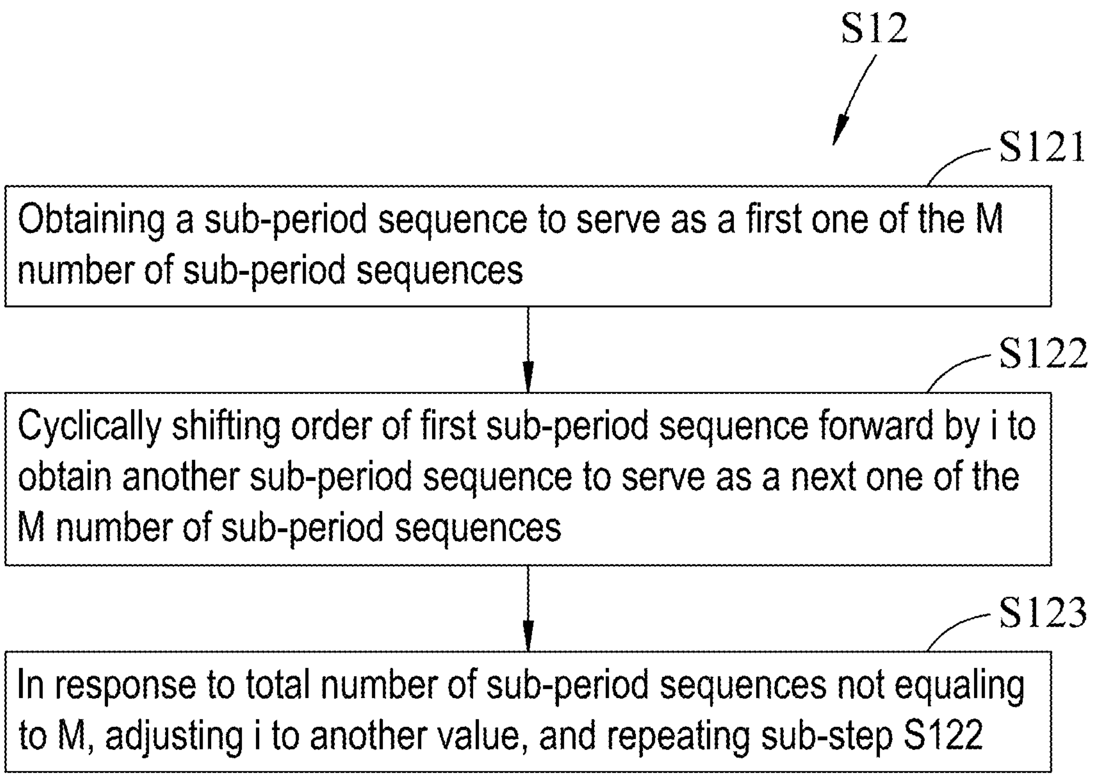
FIG. 3 is a flow chart illustrating sub-steps for obtaining M number of sub-period sequences according to an embodiment of the present disclosure.

Referring to FIGS. 1 and 3, step S12 includes sub-steps of S121 to S123.

In sub-step S121, the driving circuit 1 obtains a sub-period sequence to serve as a first one of the M number of sub-period sequences (hereinafter referred to as "the first sub-period sequence" for the sake of brevity). In one embodiment, the driving circuit 1 performs a bit-reversal permutation on indices of the sub-periods, where the indices are represented in binary, to evenly spread a total display time over the sub-periods. In such an embodiment, when the total number of sub-periods that are included in the frame period of the image of the display 2 is 16 (i.e., N=16), the first sub-period sequence that is obtained is as shown in FIG. 4. In another embodiment, the driving circuit 1 may obtain the first sub-period sequence by first performing the bit-reversal permutation on the indices of the sub-periods that are represented in binary, and then cyclically shifting the order of the first sub-period sequence forward by n, where 0<n≤N−1. In such an embodiment, when n is equal to 2 for example, the first sub-period sequence that is obtained is as shown in FIG. 5.

In sub-step S122, the driving circuit 1 cyclically shifts the order of the first sub-period sequence forward by i to obtain another sub-period sequence to serve as a next one of the M number of sub-period sequences that is unique, where 1≤i≤N−1. In one embodiment, i is initially equal to an integer value obtained by rounding N divided by M, but the disclosure is not limited in this respect. In this embodiment, the integer value is obtained by rounding half up N divided by M; but in another embodiment, the integer value may be obtained by rounding up or rounding down N divided by M, and the disclosure is not limited in this respect.

In sub-step S123, in response to a total number of the sub-period sequences that have been obtained not equaling to M, the driving circuit 1 adjusts i to another value that is unique, and repeats sub-step S122. In one embodiment, the driving circuit 1 adjusts i by incrementing i by the integer value obtained by rounding N divided by M, but the disclosure is not limited to such. In such an embodiment, an $m^{th}$ one of the M number of sub-period sequences (hereinafter referred to as "the $m^{th}$ sub-period sequence") may be obtained by cyclically shifting the first sub-period sequence forward by (m−1)×Round (N/M, 0), where 2≤m≤M, and Round (N/M, 0) represents the integer value obtained by rounding N divided by M, but the disclosure is not limited to such. In another embodiment, the $m^{th}$ sub-period sequence may be obtained by cyclically shifting the first sub-period sequence forward by Round (N×(m−1)/M, 0), where Round (N×(m−1)/M, 0) represents the integer value obtained by rounding (N×(m−1)) divided by M. In yet another embodiment, the $m^{th}$ sub-period sequence may be obtained by cyclically shifting the first sub-period sequence forward by Round (N×(m−1)/M, 0)−1.

Referring to FIGS. 1 and 2, in step S13, for a current display period, the driving circuit 1 selects the first sub-period sequence as a current sub-period sequence, and for each to-be-displayed (TBD) image in the current display period, the driving circuit 1 determines display time unit numbers of each of the light emitting elements 3 respectively in the sub-periods based on an image grayscale value of the light emitting element 3 contained in the TBD image, the number (N) and the current sub-period sequence. For each of the light emitting elements 3, the display time unit number of the light emitting element 3 in each of the sub-periods is related to a time duration in which the light emitting element 3 is activated during the sub-period. In one embodiment, selecting the first sub-period sequence as the current sub-period sequence and determining the display time unit numbers of each of the light emitting elements 3 may be performed prior to the current display period. During the current display period, the driving circuit 1 performs an activation procedure, in which the driving circuit 1 activates each of the light emitting elements 3 to emit light in each of the sub-periods according to the display time unit number thus determined. Since the way in which the light emitting elements 3 are activated, i.e., being activated according to the display time unit numbers of each of the light emitting elements 3 respectively in the sub-periods, is not the focus of this disclosure, further description thereof will be omitted for the sake of brevity.

Specifically, in one embodiment, the driving circuit 1 may perform a first determination procedure to determine the display time unit numbers of each of the light emitting elements 3 respectively in the sub-periods. For the current display period and for each TBD image, in the first determination procedure, for each of the light emitting elements 3, the display time unit numbers of the light emitting element 3 respectively in R2 number of the sub-periods that have the indices of 0 to (R2−1) among the sub-periods are set to (Q2+1)×minT, the display time unit number of the light emitting element 3 in one of the sub-periods that has the index of R2 is set to Q2×minT+R1, and the display time unit numbers of the light emitting element 3 respectively in (N−R2−1) number of the sub-periods that have the indices of (R2+1) to (N−1) among the sub-periods are set to Q2×minT, where minT is a predetermined minimum time unit number, R1 is a remainder of the image grayscale value of the light emitting element 3 divided by minT, Q1 is a quotient of the image grayscale value of the light emitting element 3 divided by minT, R2 is a remainder of Q1 divided by N, and Q2 is a quotient of Q1 divided by N. In another embodiment, the driving circuit 1 may perform a second determination procedure to determine the display time unit numbers of each of the light emitting elements 3 respectively in the sub-periods. In the second determination procedure, for each of the light emitting elements 3, when a remainder of the image grayscale value of the light emitting element 3 divided by N is zero, the display time unit numbers of the light emitting element 3 respectively in the sub-periods are set to Q; and when the remainder of the image grayscale value of the light emitting element 3 divided by N is not zero, the display time unit numbers of the light emitting element 3 respectively in R number of the sub-periods that have the indices of 0 to (R−1) among the sub-periods are set to Q+1, and the display time unit numbers of the light emitting element 3 respectively in (N−R) number of the sub-periods that have the indices of R to (N−1) among the sub-periods are set to Q, where R is a remainder of the image grayscale value of the light emitting element 3 divided by N, and Q is a quotient of the image grayscale value of the light emitting element 3 divided by N.

In step S14, for a next display period that is immediately after the current display period, the driving circuit 1 selects the next one of the M number of sub-period sequences as a next sub-period sequence that is immediately after the current sub-period sequence, and for each another TBD image in the next display period, the driving circuit 1 determines the display time unit numbers of each of the light emitting elements 3 respectively in the sub-periods based on an image grayscale value of the light emitting element 3 contained in the another TBD image, the number (N) and the next sub-period sequence.

It should be noted that, similar to the current display period, for the next display period, the driving circuit 1 may also perform the first determination procedure or the second determination procedure to determine the display time unit numbers of each of the light emitting elements 3 respectively in the sub-periods. After the display time unit numbers have been determined, the driving circuit 1 may perform the activation procedure to activate each of the light emitting elements 3 to emit light in each of the sub-periods according to the display time unit number thus determined.

A length of each of the current display period and the next display period is obtained based on a frame rate of the display 2 and a frame rate of the image capturing device. Specifically, the length of each of the current display period and the next display period is equal to K divided by the frame rate of the display 2, where, in response to a value obtained by rounding up the frame rate of the display 2 divided by the frame rate of the image capturing device to an integer (hereinafter referred to as "the divided value" for the sake of brevity) being an odd number, K is made equal to the divided value or a value of one, and in response to the divided value being an even number, K is made equal to the divided value. The frame rate of the display 2 is a number of images that are displayed by the display 2 each second. The frame rate of the image capturing device is a number of images that are captured by the image capturing device each second. In another embodiment, K may be defined as $1 \leq K \leq 10$. In yet another embodiment, the length of each of the current display period and the next display period is equal to a reciprocal of the frame rate of the image capturing device, but the disclosure is not limited to such. In should be noted that, each time the image capturing device captures an image, the image capturing device transmits a capture signal to the driving circuit 1, and in response to receipt of the capture signal, the driving circuit 1 switches to the next one of the M number of sub-period sequences, but the disclosure is not limited in this respect.

In step S15, the driving circuit 1 determines whether the next sub-period sequence is the $M^{th}$ one of the M number of sub-period sequences. When the determination is negative, the driving circuit 1 sets the next display period as the current display period, sets the next sub-period as the current sub-period sequence, and the flow goes to step S14; when the determination is otherwise, the flow returns to step S13.

By virtue of the above mentioned arrangements, when the display 2 is in constant display, the driving circuit 1 produces a plurality of frame display sequences by repeatedly using the M number of sub-period sequences. In a first example shown in FIG. 6, where M is equal to 2, a first one of the frame display sequences (hereinafter referred to as "the first frame display sequence") corresponds to the first sub-period sequence, a second one of the frame display sequences (hereinafter referred to as "the second frame display sequence") corresponds to a second one of the M number of sub-period sequences (hereinafter referred to as "the second sub-period sequence"), and since M is equal to 2, a third one of the frame display sequences corresponds to the first sub-period sequence again, and a fourth one of the frame display sequences corresponds to the second sub-period sequence again, and so on.

Referring to FIGS. 1 and 6, in the first example, the total number of sub-periods that are included in the frame period of the image of the display 2 is 16 (i.e., N=16), the exposure time of the image capturing device is 1/120 of a second, the frame rate of the display 2 is 60 frames per second (FPS) (i.e., 60 images are displayed by the display 2 each second, and the frame period of each image displayed is 1/60 of a second), and the frame rate of the image capturing device is 60 FPS (i.e., a frame period of each image captured is 1/60 of a second). M is equal to the integer value obtained by rounding the frame period of the image of the display 2 (i.e., 1/60 of a second) divided by the exposure time of the image capturing device (i.e., 1/120 of a second), which equals 2, and which indicates that the number of the M number of sub-period sequences in the first example is 2. Rounding N (i.e., 16) divided by M (i.e., 2) gives us the initial value of i, which equals 8. In the first example, the driving circuit 1 performs the bit-reversal permutation on the indices of the sub-periods to obtain the first sub-period sequence, and cyclically shifts the order of the first sub-period sequence forward by i (i.e., 8) to obtain the next sub-period sequence (i.e., the second sub-period sequence). K is equal to the value obtained by rounding up the frame rate of the image of the display 2 (i.e., 60 FPS) divided by the frame rate of the image capturing device (i.e., 60 FPS), which equals 1. The length of each of the current display period and the next display period is equal to K (i.e., 1) divided by the frame rate of the display 2 (i.e., 60 FPS), which equals 1/60 of a second. That is to say, the display 2 switches to a next one of the frame display sequences (hereinafter referred to as "the next frame display sequence") every 1/60 of a second.

Referring to FIGS. 1 and 7 and continuing from the first example, the driving circuit 1 determines the display time unit numbers respectively in the sub-periods for the first frame display sequence and the second frame display sequence of FIG. 6. For each of the light emitting elements 3 and using the first determination procedure, in a case where the image grayscale value of the light emitting element 3 is 9, and minT (i.e., the predetermined minimum time unit number) is 4, R1 is the remainder of the image grayscale value of the light emitting element 3 (i.e., 9) divided by minT (i.e., 4), which equals 1, Q1 is the quotient of the image grayscale value of the light emitting element 3 (i.e., 9) divided by minT (i.e., 4), which equals 2, R2 is the remainder of Q1 (i.e., 2) divided by N (i.e., 16), which equals 2, and Q2 is the quotient of Q1 (i.e., 2) divided by N (i.e., 16), which equals 0. Since R2 is equal to 2, the display time unit numbers of the light emitting element 3 respectively in the R2=2 number of the sub-periods that have the indices of 0 to (R2−1=1) among the sub-periods are set to (Q2+1)×minT=(0+1)×4=4 (an equivalent activation duration is represented as "4T" in FIG. 7), the display time unit number of the light emitting element 3 in the one of the sub-periods that has the index of R2=2 is set to Q2×minT+R1=0×4+1=1 (the equivalent activation duration is represented as "1T" in FIG. 7), and the display time unit numbers of the light emitting element 3 respectively in the (N−R2−1=13) number of the sub-periods that have the indices of (R2+1=3) to (N−1=15) among the sub-periods are set to Q2×minT=0×4=0.

Figure 8:
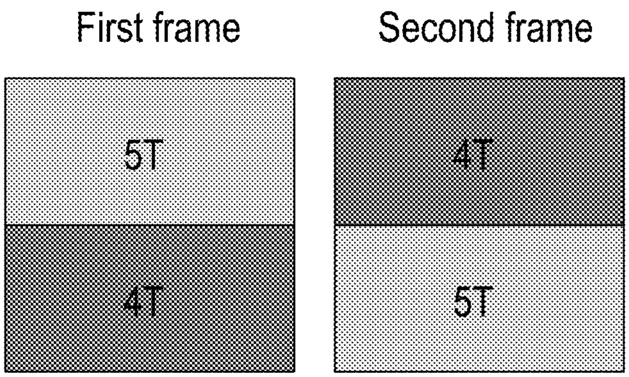
FIG. 8 is a diagram illustrating a first frame and a second frame captured when the display shows images in the way depicted in FIG. 7.

In the first example, the exposure time of the image capturing device is 1/120 of a second, which is half of the frame period of the image of the display 2 at 1/60 of a second and occupies 8 sub-periods among the 16 sub-periods of the frame period of the image of the display 2. As seen from FIG. 7, during the current display period that corresponds to the first frame display sequence, the first half of the frame period of the image of the display 2 has a total equivalent activation duration of 5T, and the second half of the frame period of the image of the display 2 has a total equivalent activation duration of 4T, resulting in that an image (a first frame) captured by the image capturing device contains a first half (corresponding to the first half of the frame period of the image of the display 2) and a second half (corresponding to the second half of the frame period of the image of the display 2) having different brightnesses, thereby producing a visual artifact. During the next display period that corresponds to the second frame display sequence, since the first sub-period sequence was cyclically shifted forward by 8 to produce the second sub-period sequence, the first half of the frame period of the image of the display 2 during the next display period has the total equivalent activation duration of 4T, and the second half of the frame period of the image of the display 2 has the total equivalent activation duration of 5T, resulting in that an image (a second frame) captured by the image capturing device contains a first half and a second half having different brightnesses, thereby producing a visual artifact. Referring to FIG. 8, when the first frame and the second frame are displayed in succession, the human eye averages the brightness of the first frame and the brightness of the second frame due to visual persistence, thereby reducing the effect of the visual artifacts since the brightness of the first frame and the brightness of the second frame are complementary to each other.

Referring to FIGS. 1 and 9, a second example of the frame display sequences of the display 2 is presented in FIG. 9. In the second example, the total number of sub-periods that are included in the frame period of the image of the display 2 is 16 (i.e., N=16), the exposure time of the image capturing device is 1/180 of a second, the frame rate of the display 2 is 60 FPS (i.e., 60 images are displayed by the display 2 each second, and the frame period of each image displayed is 1/60 of a second), and the frame rate of the image capturing device is 60 FPS (i.e., a frame period of each image captured is 1/60 of a second). M is equal to the integer value obtained by rounding the frame period of the image of the display 2 (i.e., 1/60 of a second) divided by the exposure time of the image capturing device (i.e., 1/180 of a second), which equals 3, and which indicates that the number of the M number of sub-period sequences in the second example is 3. Rounding N (i.e., 16) divided by M (i.e., 3) gives us the initial value of i, which equals 5. When adjusting i, i is incremented by the integer value obtained by rounding N divided by M, and is equal to 10 after the increment. Similar to the first example, the driving circuit 1 performs the bit-reversal permutation on the indices of the sub-periods to obtain the first sub-period sequence, cyclically shifts the order of the first sub-period sequence by i that has not been adjusted (i.e., 5) to obtain the second sub-period sequence, and cyclically shifts the order of the first sub-period sequence by i that has been adjusted (i.e., 10) to obtain a third one of the M number of sub-period sequences. K is equal to the value obtained by rounding up the frame rate of the display 2 (i.e., 60 FPS) divided by the frame rate of the image capturing device (i.e., 60 FPS), which equals 1. The length of each of the current display period and the next display period is equal to K (i.e., 1) divided by the frame rate of the display 2 (i.e., 60 FPS), which equals 1/60 of a second. That is to say, similarly to the first example, in the second example, the display 2 switches to the next frame display sequence every 1/60 of a second.

Referring to FIGS. 1 and 10, a variation of the frame display sequences of the display 2 according to the second example is presented in FIG. 10. In this variation, M is determined without taking into consideration the exposure time of the image capturing device, where M may be set to any integer greater than or equal to 2 (e.g., 2), and i may be determined to be an integer from 1 to 15 (e.g., 8). The driving circuit 1 performs the bit-reversal permutation on the indices of the sub-periods to obtain the first sub-period sequence, and cyclically shifts the order of the first sub-period sequence forward by i (i.e., 8) to obtain the second sub-period sequence. It should be noted that, using the frame display sequences of FIG. 10 may also reduce the effect of the visual artifacts although it may not be as effective as using the frame display sequences of FIG. 9.

Referring to FIGS. 1 and 11, a third example of the frame display sequences of the display 2 is presented in FIG. 11. In this third example, the total number of sub-periods that are included in the frame period of the image of the display 2 is 16 (i.e., N=16), the exposure time of the image capturing device is 1/120 of a second, the frame rate of the display 2 is 60 FPS (i.e., 60 images are displayed by the display 2 each second, and the frame period of each image displayed is 1/60 of a second), and the frame rate of the image capturing device is 24 FPS (i.e., a frame period of each image captured is 1/24 of a second). M is equal to the integer value obtained by rounding the frame period of the display 2 (i.e., 1/60 of a second) divided by the exposure time of the image capturing device (i.e., 1/120 of a second), which equals 2, and which indicates that the number of the M number of sub-period sequences in this third example is 2. Rounding N (i.e., 16) divided by M (i.e., 2) gives us the initial value of i, which equals 8. In the third example, the driving circuit 1 performs the bit-reversal permutation on the indices of the sub-periods to obtain the first sub-period sequence, and cyclically shifts the order of the first sub-period sequence forward by i (i.e., 8) to obtain the second sub-period sequence. K is equal to the value obtained by rounding up the frame rate of the display 2 (i.e., 60 FPS) divided by the frame rate of the image capturing device (i.e., 24 FPS), which equals 3. The length of each of the current display period and the next display period is equal to K (i.e., 3) divided by the frame rate of the display 2 (i.e., 60 FPS), which equals 1/20 of a second. That is to say, the display 2 switches to the next frame display sequence every 1/20 of a second. It should be mentioned that, when the frame rate of the display 2 is not a multiple of the frame rate of the image capturing device, the display 2 is generally forced to change to the next frame display sequence when the image capturing device changes frames.

Since the value obtained by rounding up the frame rate of the display 2 (i.e., 60 FPS) divided by the frame rate of the image capturing device (i.e., 24 FPS) to an integer is an odd number (i.e., 3), K is equal to the value obtained by rounding up the frame rate of the display 2 divided by the frame rate of the image capturing device to an integer, or one. FIG. 12 shows the frame display sequences of the display 2 when K is equal to 1, where the display 2 changes to the next frame display sequence after each frame of the display 2. By virtue of this arrangement, the display 2 may produce the visual artifacts of different results for each frame, and may thereby reduce the effect of the visual artifacts when the human eye averages the overall brightness produced in the M number of frame display sequences that are displayed consecutively.

In summary, for the current display period and the next display period, the driving circuit 1 uses the M number of sub-period sequences to obtain the display time unit numbers of each of the light emitting elements 3 respectively in the sub-periods. By virtue of the above arrangements, positions of the scanned dark lines (i.e., the visual artifacts) in the frames captured are staggered so that the human eye averages out the differences in the dark lines of the frames displayed due to the persistence of vision, thereby reducing the effects of the visual artifacts. In addition, M is equal to the integer value obtained by rounding the frame period of the image of the display 2 divided by the exposure time of the image capturing device, and the length of each of the current display period and the next display period is obtained based on the frame rate of the display 2 and the frame rate of the image capturing device. By virtue of the abovementioned arrangements, the visual artifacts are staggered so that the human eye averages out the differences in the dark lines due to the persistence of vision, thereby reducing the effect of the visual artifacts.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A light emission control method to be implemented by a driving circuit for controlling a display, the display including a plurality of light emitting elements, said light emission control method comprising steps of:

A) obtaining a number (N), where N>1 and N is a total number of sub-periods included in a frame period of an image of the display;

B) obtaining M number of sub-period sequences that are different from each other, each of the M number of sub-period sequences corresponding to an order in which the sub-periods are arranged and activated within the frame period, where M≥2;

C) for a current display period, selecting a first one of the M number of sub-period sequences as a current sub-period sequence, and for each to-be-displayed (TBD) image in the current display period, determining display time unit numbers of each of the plurality of light emitting elements respectively in the sub-periods based on an image grayscale value of the light emitting element contained in the TBD image, the number (N) and the current sub-period sequence, the display time unit number of the light emitting element in each of the sub-periods being related to a time duration in which the light emitting element is activated during the sub-period;

D) for a next display period that is immediately after the current display period, selecting a next one of the M number of sub-period sequences as a next sub-period sequence that is immediately after the current sub-period sequence, and for each another TBD image in the next display period, determining the display time unit numbers of each of the plurality of light emitting elements respectively in the sub-periods based on an image grayscale value of the light emitting element contained in the another TBD image, the number (N) and the next sub-period sequence; and E) in response to the next sub-period sequence not being an $M^{th}$ one of the M number of sub-period sequences, setting the next display period as the current display period, setting the next sub-period sequence as the current sub-period sequence, and repeating step D).

2. The light emission control method as claimed in claim 1, wherein step B) includes sub-steps of:

B1) obtaining a sub-period sequence to serve as said first one of the M number of sub-period sequences;

B2) cyclically shifting the order of said first one of the M number of sub-period sequences forward by i to obtain another sub-period sequence to serve as a next one of the M number of sub-period sequences that is unique, where 1≤i≤N−1; and B3) in response to a total number of the sub-period sequences that have been obtained not equaling to M, adjusting i to another value that is unique, and repeating sub-step B2).

3. The light emission control method as claimed in claim 2, the display being adapted to be communicably connected to an image capturing device, wherein in step B), M is equal to an integer value obtained by rounding the frame period of the image of the display divided by an exposure time of the image capturing device.

4. The light emission control method as claimed in claim 3, wherein i is initially equal to an integer value obtained by rounding N divided by M, and in sub-step B3), i is incremented by the integer value obtained by rounding N divided by M.

5. The light emission control method as claimed in claim 2, wherein in sub-step B1), the first one of the M number of sub-period sequences is obtained by performing a bit-reversal permutation on indices of the sub-periods, where the indices are represented in binary.

6. The light emission control method as claimed in claim 5, the display being adapted to be communicably connected to an image capturing device, wherein M is equal to an integer value obtained by rounding the frame period of the image of the display divided by an exposure time of the image capturing device; and i is initially equal to an integer value obtained by rounding N divided by M, and in sub-step B3), i is incremented by the integer value obtained by rounding N divided by M.

7. The light emission control method as claimed in claim 1, wherein each of the current display period and the next display period has a length that is equal to K divided by a frame rate of the display, where $1 \le K \le 10$, the frame rate of the display being a number of images that are displayed by the display each second.

8. The light emission control method as claimed in claim 1, the display being adapted to be communicably connected to an image capturing device, wherein a length of each of the current display period and the next display period is obtained based on a frame rate of the display and a frame rate of the image capturing device.

9. The light emission control method as claimed in claim 8, wherein the length of each of the current display period and the next display period is equal to K divided by the frame rate of the display, in response to a value obtained by rounding up the frame rate of the display divided by the frame rate of the image capturing device to an integer being an odd number, K is equal to one of the value obtained by rounding up the frame rate of the display divided by the frame rate of the image capturing device to an integer, and a value of one, and in response to the value obtained by rounding up the frame rate of the display divided by the frame rate of the image capturing device to an integer being an even number, K is equal to the value obtained by rounding up the frame rate of the display divided by the frame rate of the image capturing device to an integer, the frame rate of the display being a number of images that are displayed by the display each second, the frame rate of the image capturing device being a number of images that are captured by the image capturing device each second.

10. The light emission control method as claimed in claim 1, the display being adapted to be communicably connected to an image capturing device, wherein each of the current display period and the next display period has a length that is equal to a reciprocal of a frame rate of the image capturing device, the frame rate of the image capturing device being a number of images that are captured by the image capturing device each second.

11. The light emission control method as claimed in claim 1, wherein in at last one of step C) or step D), for each of the plurality of light emitting elements, in response to a remainder of the image grayscale value of the light emitting element divided by N being zero, the display time unit numbers of the light emitting element respectively in the sub-periods are set to Q, in response to the remainder of the image grayscale value of the light emitting element divided by N not being zero, the display time unit numbers of the light emitting element respectively in R number of the sub-periods that have indices of 0 to (R−1) among the sub-periods are set to Q+1, and the display time unit numbers of the light emitting element respectively in (N−R) number of the sub-periods that have indices of R to (N−1) among the sub-periods are set to Q, where R is a remainder of the image grayscale value of the light emitting element divided by N, and Q is a quotient of the image grayscale value of the light emitting element divided by N.

12. The light emission control method as claimed in claim 1, wherein in at least one of step C) or step D), for each of the plurality of light emitting elements, the display time unit numbers of the light emitting element respectively in R2 number of the sub-periods that have indices of 0 to (R2×1) among the sub-periods are set to (Q2+1)×minT, the display time unit number of the light emitting element in one of the sub-periods that has an index of R2 is set to Q2×minT+R1, and the display time unit numbers of the light emitting element respectively in (N−R2−1) number of the sub-periods that have indices of (R2+1) to (N−1) among the sub-periods are set to Q2×minT, where minT is a predetermined minimum time unit number, R1 is a remainder of the image grayscale value of the light emitting element divided by minT, Q1 is a quotient of the image grayscale value of the light emitting element divided by minT, R2 is a remainder of Q1 divided by N, and Q2 is a quotient of Q1 divided by N.

* * * * *